(12) United States Patent
Juels

(10) Patent No.: US 9,330,727 B1
(45) Date of Patent: May 3, 2016

(54) BINDING A DATA OBJECT TO A ROTATIONAL HARD DRIVE

(71) Applicant: EMC Corporation, Hopkinton, MA (US)

(72) Inventor: Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 170 days.

(21) Appl. No.: 14/143,174

(22) Filed: Dec. 30, 2013

(51) Int. Cl.
*G06F 12/00* (2006.01)
*G11B 27/36* (2006.01)

(52) U.S. Cl.
CPC ........................................ *G11B 27/36* (2013.01)

(58) Field of Classification Search
CPC ... G06F 3/0613; G06F 3/0656; G06F 3/0659; G06F 3/0689
See application file for complete search history.

(56) References Cited

PUBLICATIONS

Kevin D. Bowers, Marten Van Dijk, Ari Juels, Alina Opra, and Ronald L. Rivest, "How to tell if your cloud files are vulnerable to drive crashes", In ACM Conference on Computer and Communications Security, pp. 501-514, 2011.
V. Prahbakaran, A.C. Arpaci-Dusseau, and R.N. Arpaci-Dusseau, "Analysis and evolution of journaling file systems", In Proceedings of the Annual USENIX Technical Conference, pp. 105-120, 2005.
R. Rivest, "All-or-nothing encryption and the package transform", In Fast Software Encryption, pp. 210-218, 1997.

*Primary Examiner* — Yong Choe
(74) *Attorney, Agent, or Firm* — BainwoodHuang

(57) ABSTRACT

A method of determining whether a data object is stored on a storage device such as a disk includes a write operation that partitions the data object into sub-objects according to a random sequence of control bits, by (a) assigning a first block of the data object to an initially selected sub-object, and (b) assigning successive blocks to a currently selected sub-object or to a next selected sub-object based on the value of the corresponding control bit. The sub-objects are written to distinct physical regions of the storage device so that differential read latencies are experienced depending on the pattern of block access. An object read/verify operation includes reading the blocks of the data object sequentially, recording respective latencies, constructing a result word to record latency values, and calculating a difference between the control word and the result word.

20 Claims, 3 Drawing Sheets

BINDING A DATA OBJECT TO A ROTATIONAL HARD DRIVE

BACKGROUND

Data storage systems commonly include magnetic disks that provide persistent, non-volatile storage of data. They also commonly include a cache that provides dynamic, temporary storage of data during operation for increased performance. Data stored on a disk may be copied into the cache so that the data can be accessed much more quickly by a requestor, such as a host computer. Data being written by a requestor may also be temporarily stored in the cache before it is written to a disk for persistent storage.

In a variety of settings, it is beneficial to be able to verify in or through use of a file system that a storage data object such as a file is committed to a persistent storage device, such as a magnetic disk. Two objectives of interest are: (1) verification that an object is resident on a particular storage device (exclusive of other storage devices in a system) and (2) verification that an object is in persistent storage rather than in transient or volatile memory, such as a cache.

SUMMARY

Disclosed is a technique that includes writing a data object to storage in a manner such that its presence on a disk or on a particular disk is verifiable at the level of a file system. The disclosed technique enables a program reading a data object to verify that it originates from and thus resides on a rotational hard drive and that it has not been moved between storage devices. The technique makes use of explicit patterns of physical placement of data object blocks and the possibility of ascertaining such patterns as a function of disk read latencies.

In particular, a method is disclosed of determining whether a multi-block data object is stored on a physical storage device in a storage system, the storage device exhibiting differential block access latencies depending upon physical location of data blocks in the storage device. In one embodiment the storage device is a disk drive, in which block access latencies are determined in part based on whether a so-called "seek" operation is required.

The method includes creating a control word having a random sequence of control bits, and then performing an object write operation. The object write operation includes a first step of partitioning a multi-block data object into two or more distinct multi-block sub-objects according to the random sequence of control bits. This is done by (a) assigning a first block of the data object to an initially selected one of the sub-objects, and (b) for each successive block of the data object, assigning the block to a currently selected sub-object if the respective control bit has one binary value, and otherwise assigning the block to a next selected sub-object if the respective control bit has the other binary value. The object write operation also includes a second step of writing the sub-objects to respective distinct physical regions of the storage device, where the regions are sufficiently physically separated that a seek operation is required to begin accessing blocks of one region after accessing blocks of another region. This pattern result in differential read latencies that can be measured to ascertain that the data object is on the storage device and not on or in some other type of storage that does not exhibit such differential read latencies.

Subsequently, an object read operation is performed that includes reading the blocks of the data object sequentially and recording respective read latencies. A result word is constructed that has a sequence of result bits, a given result bit being assigned one binary value if the respective recorded read latency is less than a predetermined latency threshold and otherwise being assigned the other binary value if the respective recorded read latency is greater than the latency threshold. Then a difference is calculated between the control word and the result word and there is an evaluation whether the difference is less than a predetermined distance threshold. If so, then the pattern of read latencies tends to confirm that the data object is on the storage device, and if not then the opposite conclusion can be reached. This conclusion can be useful for a variety of system-level purposes, such as describe further herein.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
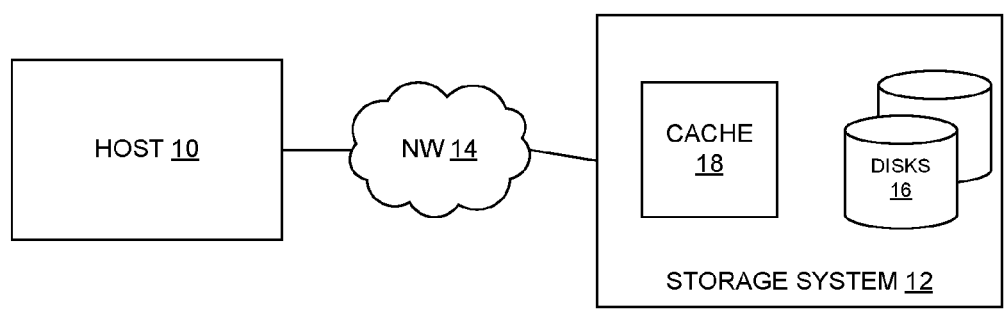
FIG. 1 is a block diagram of a computer system.

FIG. 1 shows a computer system having a host computer (host) 10 coupled to a data storage system (storage system) 12 by a network (NW) 14. The storage system 12 is part of so-called secondary storage, i.e., storage accessed via an input/output (I/O) channel of the host 10 using indirectly generated addresses. It includes magnetic disks (disks) 16 that provide persistent, non-volatile storage of data. In the illustrated embodiment the storage system 12 also includes a cache 18 that provides dynamic, temporary storage of data during operation for increased performance. Data stored on a disk 16 may be copied into the cache 18 so that the data can be accessed much more quickly by the host 10. Data being written by the host 10 may also be temporarily stored in the cache 18 before it is written to a disk 16 for persistent storage. The storage system 12 also includes control circuitry (not shown) providing control functions for data storage and transfer within the storage system 12 and between the storage system 12 and the host 10, as generally known in the art.

At one level of operation, the storage system 12 is block-oriented, i.e., it operates upon data stored in generally fixed-size blocks that are identified by corresponding block addresses. At a higher level, the system organizes and accesses data in larger collections such as files or records (generally referred to as "files" or "data objects" herein). In some cases a file system may reside completely within the host 10, and only lower-level block operations are performed between the host 10 and storage system 12 via network 14. In other cases a file system may be "distributed" in which case the storage system 12 performs block operations internally but includes file-system functionality as well, so that higher-level file operations (e.g., file opens, closes, reads, and writes) are performed between the host 10 and storage system 12 via network 14. The file abstraction is very powerful and used pervasively in computer systems. However, it is an abstraction—it provides a schematic or "logical" view of the data while typically hiding underlying "physical" details, such as the precise physical location of the data within the storage system 12.

There are many settings in which it is valuable at the file system layer of a computer system (or in a service using the file system) to verify that a data object that has been written to the storage system 12 is actually located on a disk 12, as opposed to just temporarily residing in a cache 18 for example. For example, a complex operation may involve multiple steps, any one of which may fail for a variety of reasons such as a power outage. In such cases, it can be useful to confirm that the results of one step are in persistent storage, so that if the operation is interrupted it can reliably resume at a point of such saved data, rather than having to restart at the beginning. Another need in some applications is to verify that a data object is stored on a particular disk 16 of multiple disks 16 in the storage system 12, for example to confirm that the data object has not been inadvertently moved between storage devices.

These kinds of needs in a computer system can also be described as follows:

1. Disk-specific binding: The owner of a piece of sensitive data may wish to ensure that the data is resident on a particular disk. Such verification provides evidence, for instance, that the data hasn't been moved between storage devices, which can be a useful assurance for regulatory compliance requiring data to be operated on in a given jurisdiction for example. Achieving this assurance at the file-system level can be challenging—particularly in virtualized environments.

2. Persistence verification: Binding data to storage devices can also be helpful in journaling file systems. Such systems commit batches of file updates to a storage system prior to execution of the updates themselves. Journal-entry commitment helps ensure that the file system can recover from update failures. File-system resiliency may rely very much on trustworthy placement of the commitment itself in storage, e.g., onto a hard drive. An object can be read back to verify that it was successfully written to disk. A spurious disk-write confirmation can result, however, if the commitment is resident in a drive cache and thus available only ephemerally.

A technique is described herein that facilitates such verification without direct confirmation from the storage device (e.g., disk drive in which a disk 16 is located) itself. In one embodiment, the technique utilizes the physical properties of rotational hard drives. It may be extensible, however, to other storage devices whose read performance depends upon physical placement of logical data objects.

In brief summary, the technique includes encoding a random string within a side channel, namely the layout of blocks of the object on a disk 16. In particular, blocks are laid out such that retrieving certain pairs in sequence induces a high-latency operation referred to as a disk "seek", while retrieving other pairs in sequence does not. The encoded string therefore may be decoded as a function of block retrieval times, and the result provides an indication that blocks have been retrieved from a disk.

It is assumed in the present description that network latency variation is relatively low—low enough to permit fine-grained timing of actual disk-read latencies. Where variation is higher, it may be necessary to modify the technique accordingly, for example to replicate storage objects and perform read tests across copies.

Figure 2:
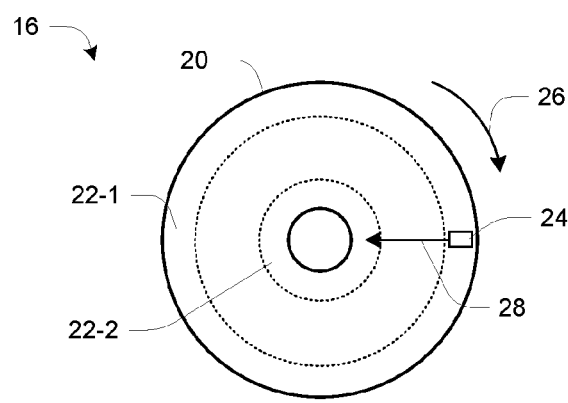
FIG. 2 is a schematic diagram of a storage disk.

FIG. 2 is a schematic illustration of a disk 16 in relevant part. It includes a "platter" 20 coated with a magnetic material in which data is recorded as patterns of magnetization, as generally known in the art. As also generally known, data is written along concentric or spiral tracks that are packed together along the radial width of the platter 20. For present purposes, two separate regions 22 are shown, a first region 22-1 adjacent the outer edge and a second region adjacent the inner edge. The regions 22 are separated by some radial distance as shown. This particular configuration is provided for purposes of illustration and explanation only—it will be understood that other pairs or sets of regions may be utilized in accordance with the description herein. Also, the technique described herein may be extended to use of more than two regions.

Data is read from and written to the platter 20 using a magnetic read/write head 24. Typically the head 24 is stationary when reading or writing data, and a stream of data is read/written along a track as the platter 20 rotates as indicated by arrow 26. Once the head 24 has been moved to a given track, data can be transferred at very high rates, owing to the high linear density of data along the track and the high rotational speed of the platter 20. The worst-case latency to read or write any data on a track after the head 24 has been positioned is equal to one period of rotation, which is on the order of 1-2 milliseconds. The head 24 is moved among the tracks as necessary by a radial "seek" movement indicated by arrow 28. Seek time is generally much longer than rotational period, more on the order of 10 milliseconds or greater. Thus a read or write that requires moving the head 24 from the region 22-1 to the region 22-2, for example, incurs a seek-related latency as well as some amount of rotational latency. The difference in latency that is experienced based on whether or not a seek occurs is a unique feature of disk drives. Other forms of storage such as solid state storage do not exhibit this behavior.

The disclosed technique employs parameters identified herein as k, n, and p. In this example, an encoding across two distinct physical regions 22 of disk is described. Extensions to more than two regions are possible.

Let $C = c_0 \| \ldots \| c_k$ denote a target data object with k constituent blocks. If the actual data in C extends across less than k blocks, it can be padded out.

Let $B = b_1 b_2 \ldots b_n$ be a random bitstring, i.e., a string of binary digits generated in a random or pseudo-random manner.

The operations of a commit/verify program P are as follows:

Write/Commit Operation:

C may first be pre-processed as follows:

For disk-specific binding, C may be transformed, under an all-or-nothing encoding as generally known in the art, into an n+1-block object M for storage. In this case, n=k. Proof of disk-specific binding in this case resolves to showing that at least one block of M is resident on the drive.

For persistence verification, M may be constructed as the encoding, under a (k; n+1)-erasure code, of target object C. In this case, the proof objective reduces to showing that at least k blocks of M are on disk, and thus that C is recoverable from disk.

P then partitions M into two sequences of blocks $M_0$ and $M_1$ as follows. Let $a_i$ (or $a(i)$) denote the sequence to which block $m_i$ is assigned, i.e., $m_i$ is assigned to $M_{a(i)}$. P assigns a first block $m_0$ to $M_0$, i.e., sets $a_0 = 0$. For $i = 1$ to n, it then assigns block $m_i$ to $M_{a(i-1)}$ if $b_i = 0$ and to $M_{1-a(i-1)}$ if $b_i = 1$. In other words, P continues assigning blocks to a given sequence as it encounters 0 values in b, and upon encountering 1 values, it switches to assigning blocks to the other sequence.

P then writes the block sequences $M_0$ and $M_1$ to the physically distinct regions $r_0$ and $r_1$ on disk—preferably at well separated radial platter positions. These correspond to the regions 22-1 and 22-2 in the example of FIG. 2. P selects these regions so that reading two successive blocks of $r_0$ or $r_1$ requires time less than τ (with high probability), while reading a block of $r_0$ followed by a block of $r_1$ (or vice versa) requires time greater than τ (with high probability), for some latency threshold parameter τ. It will be appreciated that this distinction corresponds to the above-described distinction that is based on whether or not a seek operation is involved in a given read operation, i.e., that τ represents a value distinguishing a seek-influenced latency from a pure rotational latency (no seek involved). The exact value of τ will of course vary in different systems and perhaps even at different times in a given system depending on a variety of parameters.

An additional requirement is that individual blocks of the sequences be sufficiently separated on disk so that reading blocks from one sequence does not result in the caching of blocks of the other sequence(s).

Read/Verify Operation:

P reads the blocks $m_0 \ldots$ sequentially and records the read time $t_i$ for each. It then constructs a string $B'=b'_1 \ldots b'_n$, where $b'_i=0$ if $t_i<\tau$ and $b'_i=1$ otherwise.

P then calculates a distance (such as a Hamming distance) between B and B', and deems the object C to be stored on the disk if the Hamming distance is less than some distance threshold, i.e., $|B-B'|<p$. As generally known, Hamming distance can be calculated by first performing a bitwise difference that generates a "1" in each position where the values differ, then adding up the number of "1"s in the result.

It is noted that certain errors referred to as "classification errors", i.e., erroneous setting of a bit $b'_i$, may arise as a result, for example, of variations in network latency, residual caching of some blocks of M, etc. Recall that for non-transference verification, the objective is to show that at least one block of M is resident on the target disk. For persistence verification, the goal is to show that at least k blocks are. For sufficiently low classification error rates and suitable parameters k, n, and ρ, it is possible to achieve either proof with high probability.

One aspect of the disclosed technique is that physical placement of data objects on disk is generally neither visible nor controllable at the file-system level. A technique may be used to direct physical storage object placement from the file-system layer. One technique is to exploit logical-layer file-block mappings, which often correspond closely (but imperfectly) to physical mappings. Thus data blocks that have widely separated logical block addresses at the layer of a filesystem volume, for example, are more likely to be widely separated physically on the disk. A second technique is to test the physical placement of already written objects based on retrieval latencies. For example, if repeated, alternate block reads from objects $O_1$ and $O_2$ yield high latencies, it is possible to conclude that they are physically distant from each other on disk. These objects may then be overwritten or appended to in order to guide the physical placement of later data blocks.

Figure 3:
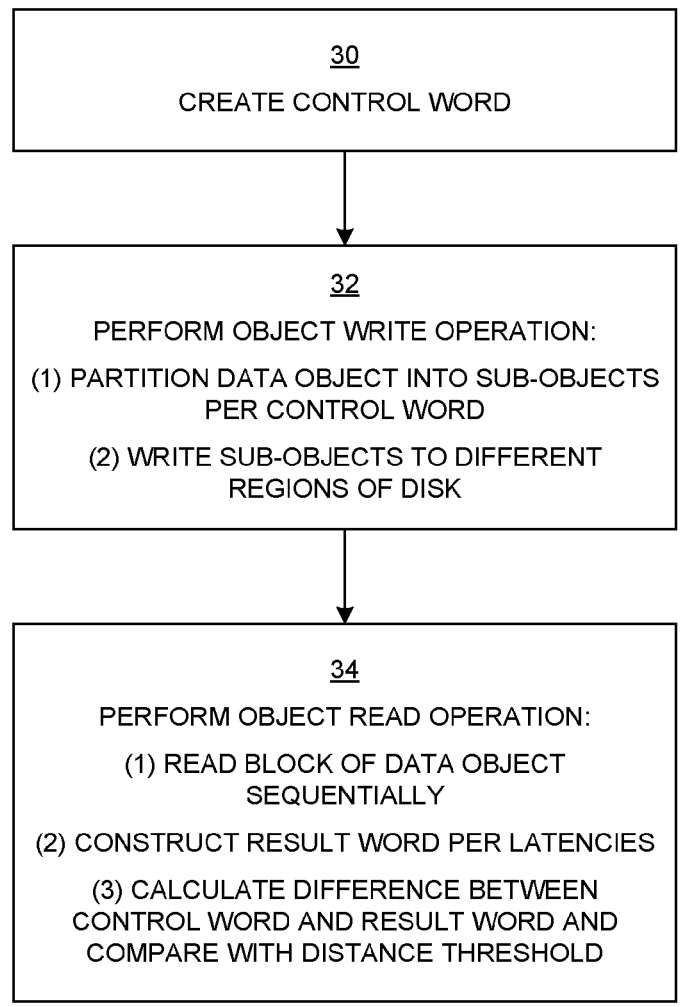
FIG. 3 is a flow diagram of a method for ascertaining presence of a data object on a disk.

FIG. 3 is a high-level flow diagram for a somewhat generalized version of the above process.

At 30, a control word is created having a random sequence of control bits. This corresponds to the bitstring B described above.

At 32, an object write operation is performed that includes (1) partitioning a multi-block data object into two or more distinct multi-block sub-objects according to the random sequence of control bits by (a) assigning a first block of the data object to an initially selected one of the sub-objects, and (b) for each successive block of the data object, assigning the block to a currently selected sub-object if the respective control bit has one binary value, and otherwise assigning the block to a next selected sub-object if the respective control bit has the other binary value, and (2) writing the sub-objects to respective distinct physical regions of the storage device, the regions being sufficiently physically separated that a seek operation is required to begin accessing blocks of one region after accessing blocks of another region. This corresponds to the write/commit operation described above.

At 34, an object read operation is performed that includes (1) reading the blocks of the data object sequentially and recording respective read latencies, (2) constructing a result word having a sequence of result bits, a given result bit being assigned one binary value if the respective recorded read latency is less than a predetermined latency threshold and otherwise being assigned the other binary value if the respective recorded read latency is greater than the latency threshold, and (3) calculating a difference between the control word and the result word and evaluating whether the difference is less than a predetermined distance threshold. This corresponds to the read/verify operation described above.

Figure 4:
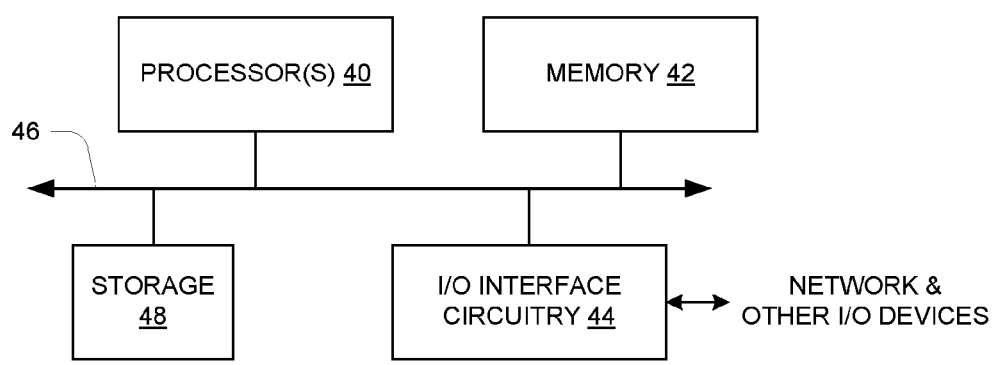
FIG. 4 is a schematic diagram of a computer from a hardware perspective.

FIG. 4 shows an example configuration of a physical computer such as a host 10 from a computer hardware perspective. The hardware includes one or more processors 40, memory 42, and interface circuitry 44 interconnected by data interconnections 46 such as one or more high-speed data buses. The interface circuitry 44 provides a hardware connection to the network 14 (FIG. 1) and perhaps other external devices/connections. The processor(s) 40 with connected memory 42 may also be referred to as "processing circuitry" herein. There may also be local storage 48 such as a local-attached disk drive or Flash drive. In operation, the memory 42 stores data and instructions of system software (e.g., operating system) and one or more application programs which are executed by the processor(s) 40 to cause the hardware to function in a software-defined manner. Thus the computer hardware executing instructions of a data placement verification application, for example, can be referred to as a placement verification circuit or placement verification component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

While various embodiments of the invention have been particularly shown and described, it will be understood by those skilled in the art that various changes in form and details may be made therein without departing from the spirit and scope of the invention as defined by the appended claims.

What is claimed is:

1. A method of determining whether a multi-block data object is stored on a physical storage device in a storage system, the storage device exhibiting differential block access latencies depending upon physical location of data blocks in the storage device, comprising:

creating a control word having a random sequence of control bits;

performing an object write operation including (1) partitioning a multi-block data object into two or more distinct multi-block sub-objects according to the random sequence of control bits by (a) assigning a first block of the data object to an initially selected one of the sub-objects, and (b) for each successive block of the data object, assigning the block to a currently selected sub-object if the respective control bit has one binary value, and otherwise assigning the block to a next selected sub-object if the respective control bit has the other binary value, and (2) writing the sub-objects to respective distinct physical regions of the storage device, the regions being sufficiently physically separated that a seek operation is required to begin accessing blocks of one region after accessing blocks of another region; and subsequently performing an object read operation including (1) reading the blocks of the data object sequentially and recording respective read latencies, (2) constructing a result word having a sequence of result bits, a given result bit being assigned one binary value if the respective recorded read latency is less than a predetermined latency threshold and otherwise being assigned the other binary value if the respective recorded read latency is greater than the latency threshold, and (3) calculating a difference between the control word and the result word and evaluating whether the difference is less than a predetermined distance threshold.

2. A method according to claim 1, using exactly two physical regions and exactly two sub-objects, such that during the partitioning at any given time one of the sub-objects is the selected sub-object and the other sub-object is not selected, and wherein assigning a block to a next selected sub-object includes selecting the one sub-object that is not currently selected.

3. A method according to claim 1, using more than two physical regions and a corresponding number of sub-objects, the regions being ordered in a predetermined manner, and wherein assigning the block to the next-selected region includes selecting a sequentially next region according to the ordering of the regions.

4. A method according to claim 1, further comprising obtaining the multi-block data object by preprocessing an original data object to enable a verification conclusion to be based on confirming that only a subset of the blocks of the multi-block data object are stored on the storage device.

5. A method according to claim 4, wherein:
the verification conclusion is that the data object is stored on the storage device to the exclusion of other storage devices in the storage system;
the preprocessing includes transforming the original data object under an all-or-nothing encoding; and
the verification conclusion is made by showing that at least one block of the multi-block data object is stored on the storage device.

6. A method according to claim 4, wherein:
the verification conclusion is that the data object is persistently stored on the storage device to the exclusion of a non-persistent cache or buffer in the storage system;
the preprocessing includes constructing the multi-block data object by encoding the original data object under a (k; n+1)-erasure code, where k is an integer number greater than zero of blocks in the original data object, and n+1 is an integer number greater than k of blocks of the multi-block data object;
the verification conclusion is made by showing that at least k blocks of the multi-block data object are stored on the storage device and that therefore the original data object is recoverable from the storage device.

7. A method according to claim 1, wherein the storage system includes a cache for temporary storage of data blocks read from the storage device to provide faster access, and wherein the physical regions are defined such that reading blocks of one of the sub-objects does not induce caching of the other sub-object.

8. A method according to claim 1, wherein calculating the difference between the control word and the result word includes calculating a Hamming distance between the control word and the result word, and wherein evaluating whether the difference is less than a predetermined distance threshold includes evaluating whether the Hamming distance is less than the predetermined distance threshold.

9. A method according to claim 1, wherein writing the sub-objects to respective distinct physical regions of the storage device includes writing the sub-objects to logically separated regions according to a logical layer mapping of block addresses to physical locations on the storage device.

10. A method according to claim 1, wherein writing the sub-objects to respective distinct physical regions of the storage device includes testing previously written data objects by performing the method of claim 1 thereon, and then overwriting or appending to the previously written data objects if the testing indicates that the previously written data objects are stored on the storage device.

11. A non-transitory computer-readable medium storing computer program instructions, the instructions being executable by a set of one or more computers to cause the computers to perform a method of determining whether a multi-block data object is stored on a physical storage device in a storage system, the storage device exhibiting differential block access latencies depending upon physical location of data blocks in the storage device, the method including:
creating a control word having a random sequence of control bits;
performing an object write operation including (1) partitioning a multi-block data object into two or more distinct multi-block sub-objects according to the random sequence of control bits by (a) assigning a first block of the data object to an initially selected one of the sub-objects, and (b) for each successive block of the data object, assigning the block to a currently selected sub-object if the respective control bit has one binary value, and otherwise assigning the block to a next selected sub-object if the respective control bit has the other binary value, and (2) writing the sub-objects to respective distinct physical regions of the storage device, the regions being sufficiently physically separated that a seek operation is required to begin accessing blocks of one region after accessing blocks of another region; and
subsequently performing an object read operation including (1) reading the blocks of the data object sequentially and recording respective read latencies, (2) constructing a result word having a sequence of result bits, a given result bit being assigned one binary value if the respective recorded read latency is less than a predetermined latency threshold and otherwise being assigned the other binary value if the respective recorded read latency is greater than the latency threshold, and (3) calculating a difference between the control word and the result word and evaluating whether the difference is less than a predetermined distance threshold.

12. A non-transitory computer-readable medium according to claim 11, wherein the method uses exactly two physical regions and exactly two sub-objects, such that during the partitioning at any given time one of the sub-objects is the selected sub-object and the other sub-object is not selected, and wherein assigning a block to a next selected sub-object includes selecting the one sub-object that is not currently selected.

13. A non-transitory computer-readable medium according to claim 11, wherein the method uses more than two physical regions and a corresponding number of sub-objects, the regions being ordered in a predetermined manner, and wherein assigning the block to the next-selected region includes selecting a sequentially next region according to the ordering of the regions.

14. A non-transitory computer-readable medium according to claim 11, wherein the method further includes obtaining the multi-block data object by preprocessing an original data object to enable a verification conclusion to be based on confirming that only a subset of the blocks of the multi-block data object are stored on the storage device.

15. A non-transitory computer-readable medium according to claim 14, wherein:
the verification conclusion is that the data object is stored on the storage device to the exclusion of other storage devices in the storage system;
the preprocessing includes transforming the original data object under an all-or-nothing encoding; and
the verification conclusion is made by showing that at least one block of the multi-block data object is stored on the storage device.

16. A non-transitory computer-readable medium according to claim 14, wherein:
the verification conclusion is that the data object is persistently stored on the storage device to the exclusion of a non-persistent cache or buffer in the storage system;
the preprocessing includes constructing the multi-block data object by encoding the original data object under a (k; n+1)-erasure code, where k is an integer number greater than zero of blocks in the original data object, and n+1 is an integer number greater than k of blocks of the multi-block data object;
the verification conclusion is made by showing that at least k blocks of the multi-block data object are stored on the storage device and that therefore the original data object is recoverable from the storage device.

17. A non-transitory computer-readable medium according to claim 11, wherein the storage system includes a cache for temporary storage of data blocks read from the storage device to provide faster access, and wherein the physical regions are defined such that reading blocks of one of the sub-objects does not induce caching of the other sub-object.

18. A non-transitory computer-readable medium according to claim 11, wherein calculating the difference between the control word and the result word includes calculating a Hamming distance between the control word and the result word, and wherein evaluating whether the difference is less than a predetermined distance threshold includes evaluating whether the Hamming distance is less than the predetermined distance threshold.

19. A non-transitory computer-readable medium according to claim 11, wherein writing the sub-objects to respective distinct physical regions of the storage device includes writing the sub-objects to logically separated regions according to a logical layer mapping of block addresses to physical locations on the storage device.

20. A non-transitory computer-readable medium according to claim 11, wherein writing the sub-objects to respective distinct physical regions of the storage device includes testing previously written data objects by performing the method of claim 1 thereon, and then overwriting or appending to the previously written data objects if the testing indicates that the previously written data objects are stored on the storage device.

* * * * *